United States Patent
Oh et al.

(10) Patent No.: US 11,994,881 B2
(45) Date of Patent: May 28, 2024

(54) IDENTIFICATION METHOD FOR DETECTING LOCATIONS OF UNMANNED AERIAL VEHICLES AND UNMANNED AERIAL VEHICLE DETECTION APPARATUS FOR PERFORMING THE SAME

(71) Applicant: Electronics and Telecommunications Research Institute, Daejeon (KR)

(72) Inventors: Jinhyung Oh, Sejong-si (KR); Kyu-Min Kang, Daejeon (KR); Jae Cheol Park, Daejeon (KR); Dong Woo Lim, Daejeon (KR); Su Na Choi, Daejeon (KR); Sunghyun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 401 days.

(21) Appl. No.: 17/242,658

(22) Filed: Apr. 28, 2021

(65) Prior Publication Data
US 2021/0341950 A1 Nov. 4, 2021

(30) Foreign Application Priority Data
Apr. 29, 2020 (KR) .................. 10-2020-0052673

(51) Int. Cl.
*G01S 13/04* (2006.01)
*B64C 39/02* (2023.01)
*G01S 13/88* (2006.01)
*G01S 19/01* (2010.01)
*G05D 1/00* (2006.01)
(Continued)

(52) U.S. Cl.
CPC .......... *G05D 1/1064* (2019.05); *B64C 39/024* (2013.01); *G01S 13/88* (2013.01); *G01S 19/01* (2013.01); *H04W 72/02* (2013.01); *H04W 72/0446* (2013.01); *B64U 2201/10* (2023.01)

(58) Field of Classification Search
CPC ....... G05D 1/1064; G01S 13/04; G01S 13/88; B64C 39/02
See application file for complete search history.

(56) References Cited

U.S. PATENT DOCUMENTS

| | | |
|---|---|---|
| 2015/0276932 A1 | 10/2015 | Lee et al. |
| 2016/0275801 A1 | 9/2016 | Kopardekar |
| 2018/0152870 A1 | 5/2018 | Park |

(Continued)

FOREIGN PATENT DOCUMENTS

| | | |
|---|---|---|
| KR | 10-2017-0028811 | 3/2017 |
| KR | 10-2017-0044277 | 4/2017 |

(Continued)

*Primary Examiner* — Tan Q Nguyen
(74) *Attorney, Agent, or Firm* — KILE PARK REED & HOUTTEMAN PLLC

(57) ABSTRACT

An identification method and an unmanned aerial vehicle (UAV) detection apparatus are provided. The identification method, as a method for preventing a collision that may occur in a process of detecting and identifying a plurality of UAVs flying in the air, detects a plurality of UAVs in the air and determines a legitimacy of flight of each of the plurality of UAVs using an identification information request message.

12 Claims, 4 Drawing Sheets

(51) Int. Cl.
  *H04W 72/02*    (2009.01)
  *H04W 72/0446*  (2023.01)

(56) References Cited

U.S. PATENT DOCUMENTS

| | | | | |
|---|---|---|---|---|
| 2019/0355263 A1* | 11/2019 | Priest | .................... | H04L 67/535 |
| 2020/0043346 A1* | 2/2020 | Vacek | .................. | G08G 5/0026 |
| 2020/0092847 A1* | 3/2020 | Rao | ....................... | B64C 39/024 |
| 2020/0313825 A1* | 10/2020 | Ryu | ...................... | H04L 5/0051 |
| 2020/0320888 A1* | 10/2020 | Hall | ..................... | G08G 5/0078 |
| 2021/0315033 A1* | 10/2021 | Zhao | ....................... | H04W 8/24 |
| 2022/0260697 A1* | 8/2022 | Saitto | ....................... | G01S 13/32 |
| 2023/0022840 A1* | 1/2023 | Lee | ...................... | H04L 5/0053 |

FOREIGN PATENT DOCUMENTS

| | | |
|---|---|---|
| KR | 10-1746580 | 6/2017 |
| KR | 10-2018-0064271 | 6/2018 |
| KR | 10-2018-0095401 | 8/2018 |
| KR | 10-2019-0021875 | 3/2019 |
| KR | 10-2019-0143306 | 12/2019 |
| KR | 10-2412266 | 6/2022 |
| WO | 2019/091867 | 5/2019 |

\* cited by examiner

FIG. 3

| Country code | Manufacturer code | Model number | Manufacturing date | Serial number | Latitude information | Longitude information | Altitude information | Reception signal strength |
|---|---|---|---|---|---|---|---|---|

DIN: Country code, Manufacturer code, Model number, Manufacturing date

GPS: Latitude information, Longitude information, Altitude information, Reception signal strength Identification information

FIG. 4

| ID of UAV detection apparatus | Maximum random time | Random time step | Identification time limit | GPS location of UAV detection apparatus |
|---|---|---|---|---|

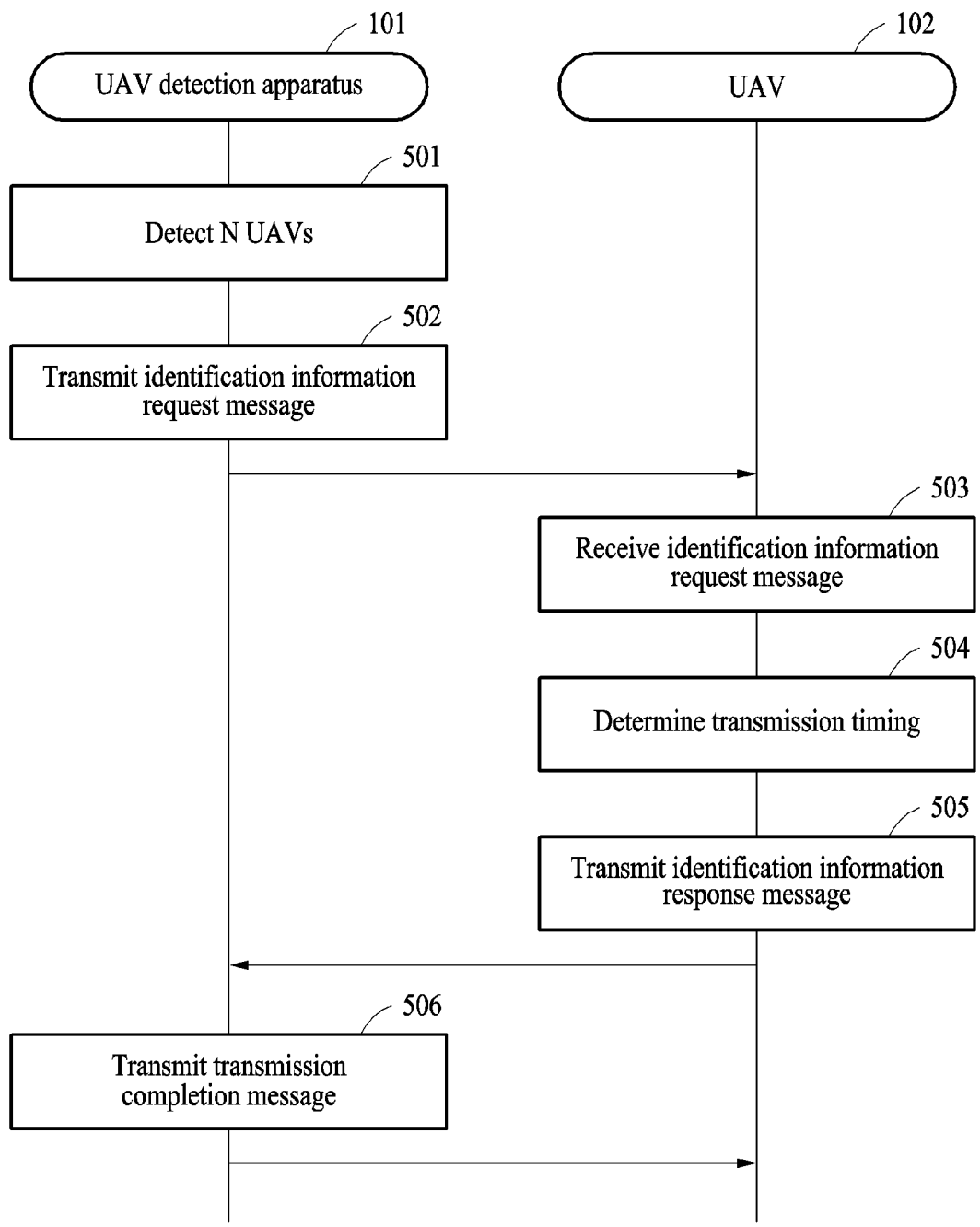

IDENTIFICATION METHOD FOR DETECTING LOCATIONS OF UNMANNED AERIAL VEHICLES AND UNMANNED AERIAL VEHICLE DETECTION APPARATUS FOR PERFORMING THE SAME

CROSS-REFERENCE TO RELATED APPLICATION(S)

This application claims the benefit of Korean Patent Application No. 10-2020-0052673, filed on Apr. 29, 2020, in the Korean Intellectual Property Office, the disclosure of which is incorporated herein by reference.

BACKGROUND

1. Field of the Invention

One or more example embodiments relate to an identification method for detecting locations of unmanned aerial vehicles (UAVs) and a UAV detection apparatus, and more particularly, an identification method for detecting locations of UAVs flying in the air and verifying a legitimacy of flight of each of the detected UAVs, and a UAV detection apparatus.

2. Description of the Related Art

Recently, cases of adverse effects using various types of drones, for example, drones crashed at the Koeberg nuclear power station in South Africa, takeoffs and landings were completely stopped due to the emergence of drones at the Gatwick Airport in the UK, and drones crashed in a Saudi oil field, are increasing. Such cases are likely to have occurred due to an absence of an identification system related to a drone flight. Accordingly, it may be difficult to track drones and identify where the responsibility lies when drones are abused for criminal acts such as safety/security threats and invasion of privacy. A technology for responding to adverse effects of small drones is broadly divided into three stages.

A first stage is drone detection corresponding to an initial stage. The drone detection refers to a stage of detecting a drone that has invaded a restricted airspace or determining whether it is a legitimate drone through, for example, an analysis of a flight trajectory.

A second stage is drone identification to identify a drone owner or aircraft registration information through identification of an identifier (ID) of a drone. However, for the drone identification, there is no ID identification technology applicable to various small drones.

A third stage is an incapacitation technology of removing intrusions or threats of drones using a physical scheme after detection or identification of drones. The incapacitation technology is a technology of disabling a drone by capturing the drone determined as a threat with a net or using radio disturbance such as geofencing and an electromagnetic pulse (EMP).

To identify drones, a communication between a drone with an identification module and a ground discriminator needs to be performed. Notifying the ground discriminator of an ID and real-time location information of the drone through the above communication link may be a minimum level of identification. Accordingly, an identification module mounted in a small drone may essentially measure a global positioning system (GPS) signal and also need to measure an atmospheric pressure to precisely measure an altitude.

The ground discriminator may perform a larger number of functions than an identification module of the drone. A main function of the ground discriminator may be a beamforming function to increase a drone identification distance. The beamforming function may be a function of sharpening beams so that an identification signal travels further, and accordingly a plurality of antennas are essential. Thus, the beamforming function may need to be implemented in the ground discriminator that is not affected by a form factor.

SUMMARY

Example embodiments may provide an identification method and a UAV detection apparatus that may detect each of a plurality of unmanned aerial vehicles (UAVs) in an environment in which the UAVs are flying in the air.

Example embodiments may provide an identification method and a UAV detection apparatus that may prevent data collision that occurs in a communication process by performing a communication with each of UAVs using a unicast transmission scheme.

Example embodiments may provide an identification method and a UAV detection apparatus that may identify an illegally flying UAV among UAVs using a flight purpose and identification information (for example, an identifier (ID)) of each of detected UAVs.

According to an aspect, there is provided an identification method performed by a UAV detection apparatus, the identification method including transmitting a radar signal for detecting a UAV, based on a detection distance of the UAV detection apparatus, detecting a plurality of UAVs existing within the detection distance according to a radar signal reflected from each of the plurality of UAVs, transmitting an identification information request message to each of the detected plurality of UAVs, receiving an identification information response message from a UAV that receives the identification information request message, comparing a number of identification information response messages that are received and a number of identification information request messages that are transmitted to the plurality of UAVs, and transmitting a transmission completion message to a UAV that transmits an identification information response message, based on a result of the comparing.

The transmitting of the identification information request message may include transmitting an identification information request message to each of the detected plurality of UAVs, using a broadcast communication scheme.

The identification information request message may include information to determine a timing to perform a unicast communication scheme between the UAV detection apparatus and a UAV.

The receiving of the identification information response message may include receiving the identification information response message from the UAV, using a unicast communication scheme.

The UAV may determine a random transmission time to transmit an identification information response message corresponding to an identification information request message received from the UAV detection apparatus, and may transmit an identification information response message to the UAV detection apparatus in the determined random transmission time, using the unicast communication scheme.

The receiving of the identification information response message may include receiving the identification information response message from the UAV in different random transmission times determined for each of the plurality of UAVs.

According to another aspect, there is provided an identification method performed in a UAV, the identification method including receiving an identification information request message from a UAV detection apparatus during flying, changing a flight direction of the UAV to a location of the UAV detection apparatus based on a global positioning system (GPS) location included in the identification information request message, and transmitting an identification information response message to the UAV detection apparatus in the changed flight direction.

The transmitting of the identification information response message may include determining a random transmission time to transmit the identification information response message to the UAV detection apparatus using a maximum random time and a random time step that are included in the identification information request message, and transmitting the identification information response message to the UAV detection apparatus within the random transmission time, using a unicast communication scheme.

The maximum random time may be a maximum value of time that needs to be considered when each UAV receiving the identification information request message transmits an identification information response message to the UAV detection apparatus, and the random time step may be a step of dividing a random time in which a UAV is capable of transmitting an identification information response message.

According to another aspect, there is provided a UAV detection apparatus including a processor configured to transmit a radar signal for detecting a UAV, based on a detection distance of the UAV detection apparatus, to detect a plurality of UAVs existing within the detection distance according to a radar signal reflected from each of the plurality of UAVs, to transmit an identification information request message to each of the detected plurality of UAVs, to receive an identification information response message from a UAV that receives the identification information request message, to compare a number of identification information response messages that are received and a number of identification information request messages that are transmitted to the plurality of UAVs, and to transmit a transmission completion message to a UAV that transmits an identification information response message, based on a comparison result.

The processor may be configured to transmit an identification information request message to each of the detected plurality of UAVs, using a broadcast communication scheme.

The identification information request message may include information to determine a timing to perform a unicast communication scheme between the UAV detection apparatus and a UAV.

The processor may be configured to receive the identification information response message from the UAV using a unicast communication scheme.

The UAV may determine a random transmission time to transmit an identification information response message corresponding to an identification information request message received from the UAV detection apparatus, and may transmit an identification information response message to the UAV detection apparatus in the determined random transmission time, using the unicast communication scheme.

The processor may be configured to receive the identification information response message from the UAV in different random transmission times determined for each of the plurality of UAVs.

According to another aspect, there is provided a UAV including a processor configured to receive an identification information request message from a UAV detection apparatus during flying, to change a flight direction of the UAV to a location of the UAV detection apparatus based on a GPS location included in the identification information request message, and to transmit an identification information response message to the UAV detection apparatus in the changed flight direction.

The processor may be configured to determine a random transmission time to transmit the identification information response message to the UAV detection apparatus using a maximum random time and a random time step that are included in the identification information request message, and to transmit the identification information response message to the UAV detection apparatus within the random transmission time, using a unicast communication scheme.

The maximum random time may be a maximum value of time that needs to be considered when each UAV receiving the identification information request message transmits an identification information response message to the UAV detection apparatus, and the random time step may be a step of dividing a random time in which a UAV is capable of transmitting an identification information response message.

Additional aspects of example embodiments will be set forth in part in the description which follows and, in part, will be apparent from the description, or may be learned by practice of the disclosure.

According to example embodiments, an identification method and a UAV detection apparatus may detect each of a plurality of UAVs in an environment in which the UAVs are flying in the air.

According to example embodiments, an identification method and a UAV detection apparatus may prevent data collision that occurs in a communication process by performing a communication with each of UAVs using a unicast transmission scheme.

According to example embodiments, an identification method and a UAV detection apparatus may identify an illegally flying UAV among UAVs using a flight purpose and identification information (for example, an ID) of each of detected UAVs.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3 is a diagram illustrating a structure of an identification signal according to an example embodiment;

FIG. 4 is a diagram illustrating a structure of an identification information request message according to an example embodiment;

FIG. 5 is a flowchart illustrating an identification method according to an example embodiment.

DETAILED DESCRIPTION

Hereinafter, example embodiments will be described in detail with reference to the accompanying drawings.

Figure 1:
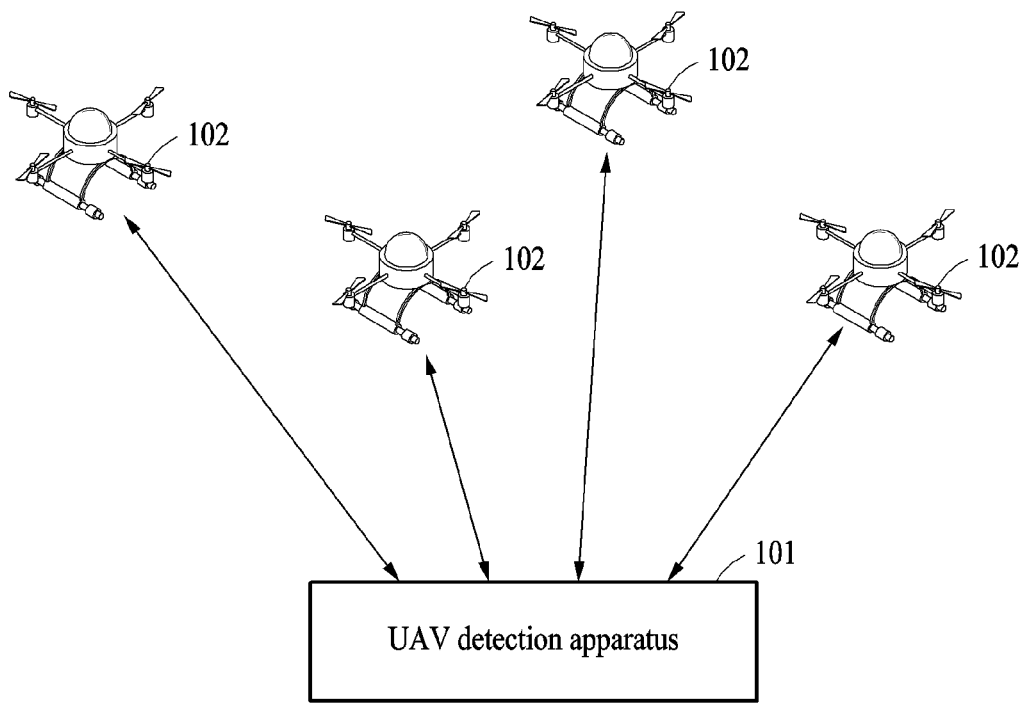
FIG. 1 is a diagram illustrating a plurality of unmanned aerial vehicles (UAVs) and a UAV detection apparatus according to an example embodiment.

FIG. 1 is a diagram illustrating a plurality of unmanned aerial vehicles (UAVs) and a UAV detection apparatus according to an example embodiment.

Referring to FIG. 1, a UAV detection apparatus 101 may detect a plurality of UAVs 102 and may transmit and receive messages to and from the plurality of UAVs 102. For example, the UAV detection apparatus 101 may transmit a radar signal for detecting a UAV 102 based on a detection distance of the UAV detection apparatus 101. The UAV detection apparatus 101 may use a data signal to verify approximate locations and trajectories of the UAVs 102, before identifying the UAVs 102 using radar signals.

The UAV detection apparatus 101 may detect the plurality of UAVs 102, for example, "N" UAVs 102, existing within the detection distance according to radio signals reflected from the "N" UAVs 102. The UAV detection apparatus 101 may transmit identification information request messages to the detected "N" UAVs 102. The UAV detection apparatus 101 may receive an identification information response message from a UAV 102 that receives an identification information request message.

The UAV detection apparatus 101 may use two communication schemes to identify a drone in an environment in which a plurality of drones are flying. The two communication schemes may include a unicast communication scheme and a broadcast communication scheme.

The unicast communication scheme may be used when a UAV transmits an identification information request message to a UAV detection apparatus in response to a request from the UAV detection apparatus being received. Since identification is performed in the unicast communication scheme only when necessary, power consumption of a drone may be minimized.

The broadcast communication scheme may be used when a UAV periodically transmits an identification information response message to the UAV detection apparatus even though there is no request from the UAV detection apparatus. Since an identification signal is periodically transmitted in the broadcast communication scheme, identification information may be stably acquired.

For example, to identify each of the plurality of UAVs 102 using the unicast communication scheme in an environment in which the UAVs 102 are flying in the air, there is a need to prevent collisions that occur when a plurality of UAVs transmits messages to a single UAV detection apparatus. To solve the above phenomenon, the unicast communication scheme may be used to identify a plurality of UAVs in an environment in which the UAVs are flying.

The UAV detection apparatus 101 may compare a number of identification information response messages that are received and a number of identification information request messages that are transmitted to "N" UAVs. When the number of identification information response messages and the number of identification information request messages are the same based on a comparison result, the UAV detection apparatus 101 may transmit a transmission completion message to a UAV that transmits an identification information response message. When the number of identification information response messages and the number of identification information request messages are different from each other, the UAV detection apparatus 101 may retransmit an identification information request message to each of detected "N" UAVs.

When an identification information response message is received from a UAV in response to an identification information request message being retransmitted, the UAV detection apparatus 101 may transmit a transmission completion message to the UAV.

Figure 2:
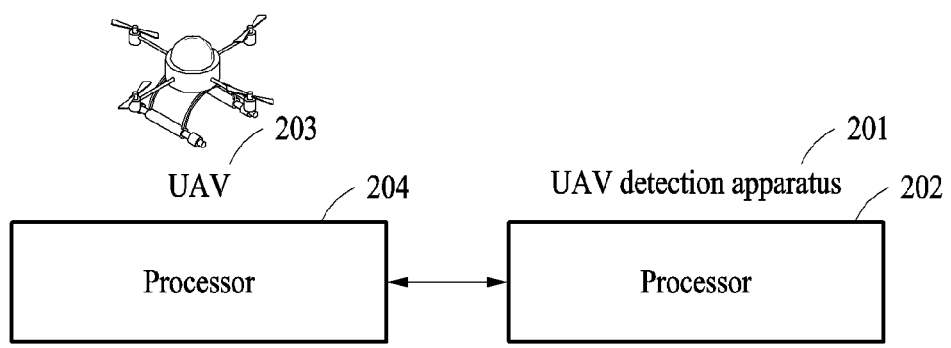
FIG. 2 is a diagram illustrating a configuration of each of a UAV and a UAV detection apparatus according to an example embodiment.

FIG. 2 is a diagram illustrating a configuration of each of a UAV and a UAV detection apparatus according to an example embodiment.

Referring to FIG. 2, a UAV detection apparatus 201 and a UAV 203 may transmit and receive messages using a unicast communication scheme and a broadcast communication scheme. Accordingly, the UAV detection apparatus 201 may detect a UAV flying in the air, and may verify a legitimacy of flight of the detected UAV.

The UAV detection apparatus 201 may include a processor 202. The processor 202 may transmit identification information request messages to "N" UAVs existing within a detection distance of the UAV detection apparatus 201, using the broadcast communication scheme.

The processor 202 may receive an identification information response message from the UAV 203. In an example, the processor 202 may perform a function of transmitting and receiving a message. The processor 202 may control a radar signal within the detection distance of the UAV detection apparatus 201. For example, the processor 202 may be a beamforming antenna to adjust antenna beams in a movement direction of a UAV based on a detection result when it is difficult to identify a detected UAV.

The function may support both two types of a mechanical antenna movement in an analog form and changing a beam pattern in a digital form. The processor 202 may analyze an approximate location of a UAV that enters the detection distance, in a stage for detecting and identifying a UAV. Since detection using a radar signal is basically performed before identification of a UAV, the detection distance may need to be greater than an identification distance.

The processor 202 may transmit a radar signal for detecting a UAV, based on the detection distance of the UAV detection apparatus 201.

The processor 202 may detect "N" UAVs existing within the detection distance according to a radar signal reflected from a UAV. The processor 202 may recognize a number of UAVs flying nearby according to reflected signals, and may detect all "N" UAVs identified in a detection stage during identification.

Since the processor 202 may recognize a flight trajectory and direction of a UAV when a radar signal is used, the flight trajectory and direction of the UAV may also be provided as data to be used when a direction of a beamforming antenna is switched.

The processor 202 may store identification information received from a UAV flying in the air as raw data. Here, the identification information may be information that is periodically transmitted by a UAV to a UAV detection apparatus even though there is no request from the UAV detection apparatus. The identification information may include a drone identification number (DIN), global positioning system (GPS) information, and a reception signal strength, and may be information indicating a location of a UAV. The processor 202 may define the identification information as raw data.

The processor 202 may retrieve a drone ID included in raw data from a database, to obtain detailed drone identification information such as insurance information, owner information, or drone operator information. The processor 202 may provide an interface that accesses the database.

The UAV 203 may include a processor 204. The processor 204 may transmit the identification information including the DIN, the GPS information, and the reception signal strength to the UAV detection apparatus 201, as shown in FIG. 2.

Based on altitude information included in the GPS information, the processor 204 may check an altitude using a barometer at a low altitude, or using a GPS together with the barometer at a high altitude. Since the identification information needs to include the reception signal strength, the reception signal strength may also be used as data for experiments and identification distance estimation.

The processor 204 may operate an antenna that enables multi-band reception and sufficiently transmission and reception gains for identification of a drone at a distance according to an antenna transmission and reception unit. The processor 204 may measure a GPS signal, to obtain information about a latitude, a longitude and an altitude of a current location of a UAV in a GPS module mounted in the UAV. In response to a request from a ground discriminator being received, the processor 204 may generate an identification information response message including GPS information and may transmit the generated identification information response message. The processor 204 may determine a time to transmit an identification signal to a UAV detection apparatus so that each UAV may transmit an identification signal.

Here, when a plurality of UAVs simultaneously transmit identification signals to the UAV detection apparatus, the identification signals may collide in the UAV detection apparatus. To prevent the above collision of the identification signals, the processor 204 may determine a random time to transmit an identification signal in each of the UAVs and may transmit an identification signal in the random time.

FIG. 3 is a diagram illustrating a structure of an identification signal according to an example embodiment.

Referring to FIG. 3, a UAV may generate an identification signal for identifying the UAV while flying in the air. The UAV may transmit the generated identification signal to a UAV detection apparatus located on the ground, while flying in the air. Identification information may be information to specify a UAV, and may broadly include DIN, GPS information, and a reception signal strength.

(1) DIN

The DIN may be a numbering system that may specify a UAV, and a configuration of the DIN may vary depending on a data format or an operating scheme of a UAV. For example, the DIN may be implemented as a country code, a manufacturer code, a model number, a manufacturing date, and a serial number.

The country code may be a code to indicate a country (for example, an independent state or a non-independent area data) and a territory for data processing and a communication, and may be a shortened geocode represented by alphabet letters or numbers used to indicate a country name.

The manufacturer code may be a company code indicating a company that performs a manufacturing process such as designing, fabricating, or producing of a UAV.

The model number may be a unique number to identify a UAV.

The manufacturing date may be the date at which a UAV is produced.

The serial number may be an integer of a series of unique sequences assigned to identify a UAV.

2) GPS Information

The GPS information may be information obtained by measuring a location of a UAV through a satellite, and may include latitude information, longitude information, and altitude information acquired in real time from the satellite.

The latitude information may be information indicating a southern location and a northern location of a UAV based on an equator of a map or a globe.

The longitude information, as a line connecting the North Pole and the South Pole along a surface of the earth in a direction perpendicular to the equator, that is a vertical direction, may be information to measure time.

The altitude information may be information indicating a height of a celestial body measured based on the horizon using an angle.

3) Reception Signal Strength

The reception signal strength may be a magnitude of a signal received from a UAV detection apparatus located on the ground.

FIG. 4 is a diagram illustrating a structure of an identification information request message according to an example embodiment.

Referring to FIG. 4, a UAV detection apparatus may detect one or more UAVs flying in the air. For example, when a UAV in the air is detected, the UAV detection apparatus may recognize an approximate location and a trajectory of the UAV. The UAV detection apparatus may transmit an identification information request message (IIRQM) to the detected UAV. Here, the UAV detection apparatus may use a broadcasting communication scheme to transmit the identification information request message to the detected UAV.

The identification information request message may be information to determine a timing to individually perform a unicast communication scheme between the UAV detection apparatus and the UAV. The identification information request message may include, for example, an ID of a UAV detection apparatus, a maximum random time, a random time step, a drone identification time limit, and a GPS location of a UAV detection apparatus.

The ID of the UAV detection apparatus may represent an address of a UAV detection apparatus to receive an identification information response message corresponding to an identification information request message from a UAV. The ID the UAV detection apparatus may be an address to identify a UAV detection apparatus that transmits an identification information request message.

The maximum random time may refer to a maximum value of time that needs to be considered when each UAV that receives an identification information request message transmits an identification information response message to the UAV detection apparatus. In other words, the maximum random time may be a maximum value of time at which a UAV is to randomly transmit an identification information response message.

In an example, the maximum random time may be set to 5 milliseconds (ms) as a maximum value of time. In this example, the UAV may randomly transmit an identification information response message to the UAV detection apparatus within 5 ms that is a maximum value from a point in time at which an identification information request message is received from the UAV detection apparatus.

The random time step may refer to a step of dividing a random time in which a UAV may transmit an identification information response message. For example, when the maximum random time is set to 5 ms, a random transmission time for transmission of an identification information response message from a UAV to the UAV detection apparatus may need to be determined within a period of 0 ms to 5 ms.

In this example, when a random time step is set to "10", a time slot for transmission of the identification information response message by the UAV may need to be determined at an interval of 0.5 ms obtained by dividing 5 ms by "10". In an example, when UAVs A and B receive an identification information request message in which a random time step is set to "10" and in which a maximum random time is set to 5 ms, the UAV A may determine a random transmission time as 0.5 ms using a random timer, and the UAV B may determine a random transmission time as 3.5 ms using a random timer.

Subsequently, based on the determined random transmission times, the UAV A may transmit an identification information response message to the UAV detection apparatus in 0.5 ms, and the UAV B may transmit an identification information response message to the UAV detection apparatus in 3.5 ms.

The identification time limit may refer to a maximum time in which identification needs to be performed in a detection stage, an identification stage, and an incapacitation stage. Here, the identification time limit may have a value less than an identification time limit of a UAV.

1) The detection stage may refer to a stage of detecting a shape of a UAV by performing identification with eyes of an administrator or using electronic equipment such as a radar. Here, the UAV detection apparatus may detect a shape of a UAV without a message exchange with the UAV detection apparatus.
2) The identification stage may refer to a stage of analyzing information associated with flight of various types of UAVs through a message exchange with UAVs.
3) The incapacitation stage may refer to a stage of blocking a UAV from flying if the UAV is determined to illegally fly by performing the detection stage and the identification stage.

The GPS location of the UAV detection apparatus may be location information of a UAV detection apparatus located on the ground. The GPS location may be, for example, information to induce a UAV to change a flight direction of the UAV towards a location of a UAV detection apparatus and to transmit an identification information response message to the UAV detection apparatus in the changed direction.

FIG. 5 is a flowchart illustrating an identification method according to an example embodiment.

In operation 501, a UAV detection apparatus may detect a UAV flying in the air within a detection distance of the UAV detection apparatus using a radar signal. When a UAV is absent, the UAV detection apparatus may repeatedly perform an operation of detecting a UAV.

In operation 502, the UAV detection apparatus transmits an identification information request message to a UAV existing within the detection distance, when the UAV is present. For example, when the radar signal is used, the UAV detection apparatus may determine a location and a trajectory of a UAV through a signal reflected from the UAV. In this example, the UAV detection apparatus may transmit an identification information request message to the UAV located in the determined location and the determined trajectory.

In operation 503, the UAV may receive the identification information request message from the UAV detection apparatus.

In operation 504, the UAV may determine a time to transmit an information response message corresponding to the identification information request message to the UAV detection apparatus by operating a random timer. The UAV may individually determine transmission timing thereof based on a maximum random time, a random time step and a drone identification time limit that are included in the identification information request message.

In operation 505, the UAV may transmit the identification information response message to the UAV detection apparatus in a transmission start time according to the determined transmission timing.

In operation 506, the UAV detection apparatus may determine whether the same number of identification information response messages as a number of detected UAVs is received. The UAV detection apparatus may compare a number of identification information response messages that are received and a number of identification information request messages that are transmitted to "N" UAVs. The UAV detection apparatus may transmit a transmission completion message (for example, a Group ACK message) to the UAV that transmits the identification information response message according to a comparison result.

For example, when some of the detected UAVs do not send an identification information response message, the UAV detection apparatus may set a beam direction of a beamforming antenna to a direction in which a UAV is detected and may retransmit an identification information request message.

UAVs that do not transmit identification information response messages even though the UAVs are detected by UAV detection apparatus because the UAVs fail to receive an identification information request message in a previous operation may be identified based on an identification information request message retransmitted from the UAV detection apparatus. Subsequently, each of the UAVs may transmit an identification information response message according to a random timing.

Figure 6:
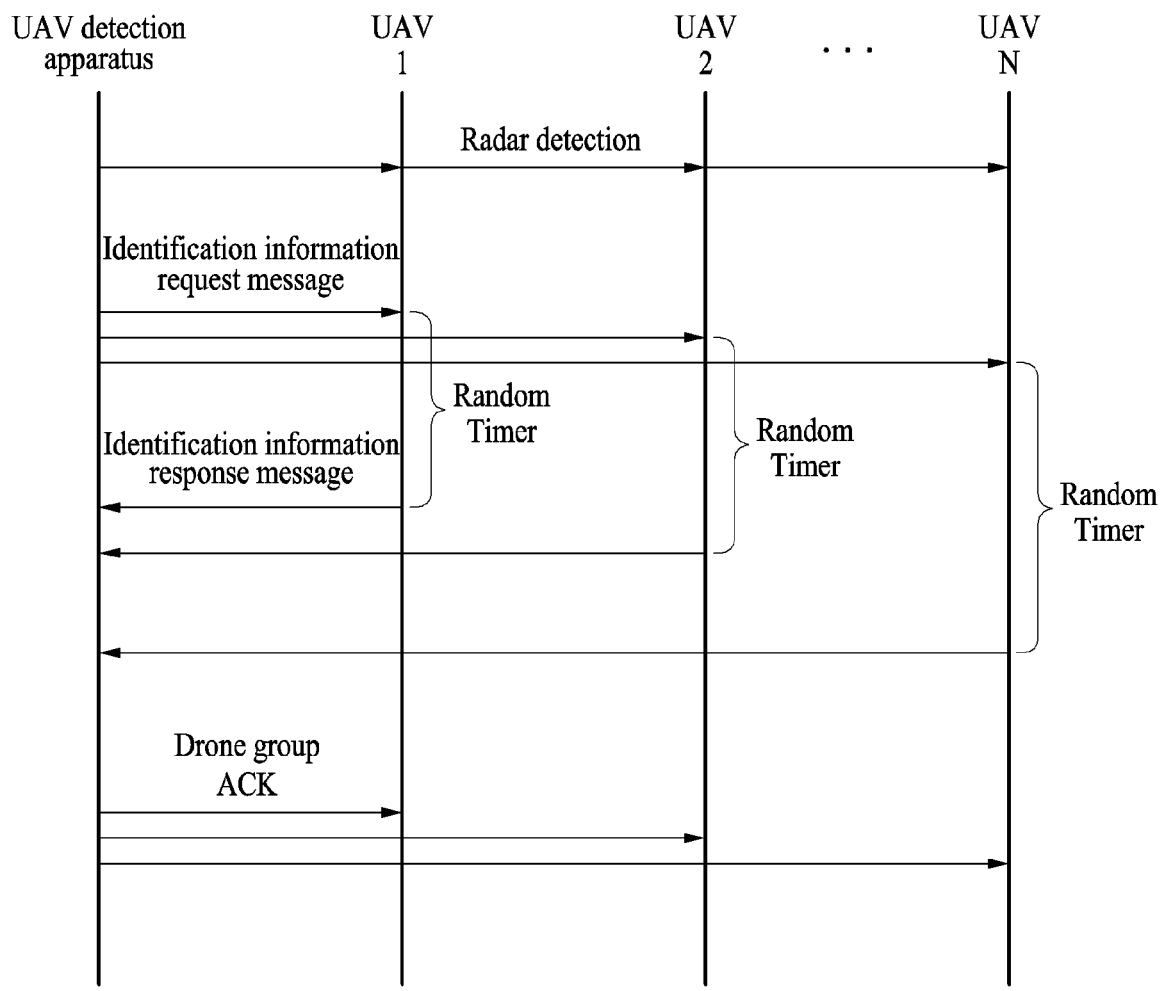
FIG. 6 is a diagram illustrating a process of performing a communication between a UAV detection apparatus and each of a plurality of UAVs using a unicast communication scheme according to an example embodiment.

FIG. 6 is a diagram illustrating a flow of messages between a UAV detection apparatus and UAVs according to an example embodiment.

The UAV detection apparatus may use a radar to detect a UAV. The UAV detection apparatus may start detection of a UAV flying in the air within a detection distance of the UAV detection apparatus using the radar.

When "N" UAVs are detected within the detection distance in the air, the UAV detection apparatus may transmit an identification information request message to each of the detected "N" UAVs. Here, the UAV detection apparatus may transmit identification information request messages to the "N" UAVs at the same time using a broadcast communication scheme.

Each of the "N" UAVs may receive an identification information request message from the UAV detection apparatus. When the identification information request message is received, each of the "N" UAVs may operate a random timer to determine a timing to transmit an identification information response message to the UAV detection apparatus.

Each of the "N" UAVs may transmit an identification information response message to the UAV detection apparatus, in response to the timing determined to transmit the identification information response message. Each of the "N" UAVs may individually transmit an identification information response message to the UAV detection apparatus, using a unicast communication scheme.

The UAV detection apparatus may complete transmission of an identification information response message from each of the "N" UAVs within a random time. When the transmission is completed, the UAV detection apparatus may transmit a Group ACK message to each of the "N" UAVs that transmit identification information response messages.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer and may be implemented as various recording media such as a magnetic storage medium, an optical reading medium, and a digital storage medium.

Various techniques described herein may be implemented in digital electronic circuitry, computer hardware, firmware, software, or combinations thereof. The techniques may be implemented as a computer program product, i.e., a computer program tangibly embodied in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as a compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include all computer storage media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

It should be understood that example embodiments disclosed herein are merely illustrative and are not intended to limit the scope of the disclosure. It will be apparent to those skilled in the art that various modifications of the example embodiments may be made without departing from the spirit and scope of the claims and their equivalents.

What is claimed is:

1. An identification method performed by an unmanned aerial vehicle (UAV) detection apparatus, the identification method comprising:
   transmitting a radar signal for detecting a UAV, based on a detection distance of the UAV detection apparatus;
   detecting a plurality of UAVs existing within the detection distance according to a radar signal reflected from each of the plurality of UAVs;
   transmitting an identification information request message to each of the detected plurality of UAVs;
   receiving, via a unicast communication scheme or a broadcast communication scheme, an identification information response message from a UAV that receives the identification information request message;
   comparing a number of identification information response messages that are received and a number of identification information request messages that are transmitted to the plurality of UAVs; and
   transmitting a transmission completion message to a UAV that transmits an identification information response message, based on a result of the comparing,
   wherein the identification information response message includes a drone identification number (DIN).

2. The identification method of claim 1, wherein the transmitting of the identification information request message comprises transmitting an identification information request message to each of the detected plurality of UAVs, using a broadcast communication scheme.

3. The identification method of claim 1, wherein the identification information request message comprises information to determine a timing to perform a unicast communication scheme between the UAV detection apparatus and a UAV.

4. The identification method of claim 1, wherein the receiving of the identification information response message comprises receiving the identification information response message from the UAV, using the unicast communication scheme.

5. The identification method of claim 3, wherein the UAV determines a random transmission time to transmit an identification information response message corresponding to an identification information request message received from the UAV detection apparatus, and transmits an identification information response message to the UAV detection apparatus in the determined random transmission time, using the unicast communication scheme.

6. The identification method of claim 1, wherein the receiving of the identification information response message comprises receiving the identification information response message from the UAV in different random transmission times determined for each of the plurality of UAVs.

7. An unmanned aerial vehicle (UAV) detection apparatus comprising:
a processor configured to:
transmit a radar signal for detecting a UAV, based on a detection distance of the UAV detection apparatus;
detect a plurality of UAVs existing within the detection distance according to a radar signal reflected from each of the plurality of UAVs;
transmit an identification information request message to each of the detected plurality of UAVs;
receive, via a unicast communication scheme or a broadcast communication scheme, an identification information response message from a UAV that receives the identification information request message;
compare a number of identification information response messages that are received and a number of identification information request messages that are transmitted to the plurality of UAVs; and
transmit a transmission completion message to a UAV that transmits an identification information response message, based on a comparison result,
wherein the identification information response message includes a drone identification number.

8. The UAV detection apparatus of claim 7, wherein the processor is configured to transmit an identification information request message to each of the detected plurality of UAVs, using a broadcast communication scheme.

9. The UAV detection apparatus of claim 7, wherein the identification information request message comprises information to determine a timing to perform a unicast communication scheme between the UAV detection apparatus and a UAV.

10. The UAV detection apparatus of claim 7, wherein the processor is configured to receive the identification information response message from the UAV using the unicast communication scheme.

11. The UAV detection apparatus of claim 10, wherein the UAV determines a random transmission time to transmit an identification information response message corresponding to an identification information request message received from the UAV detection apparatus, and transmits an identification information response message to the UAV detection apparatus in the determined random transmission time, using the unicast communication scheme.

12. The UAV detection apparatus of claim 7, wherein the processor is configured to receive the identification information response message from the UAV in different random transmission times determined for each of the plurality of UAVs.

* * * * *